Sept. 23, 1958 R. L. MORSE 2,853,341
DUMP TRUCK SUPPORT STABILIZING MEANS
Filed Oct. 2, 1956 4 Sheets-Sheet 1
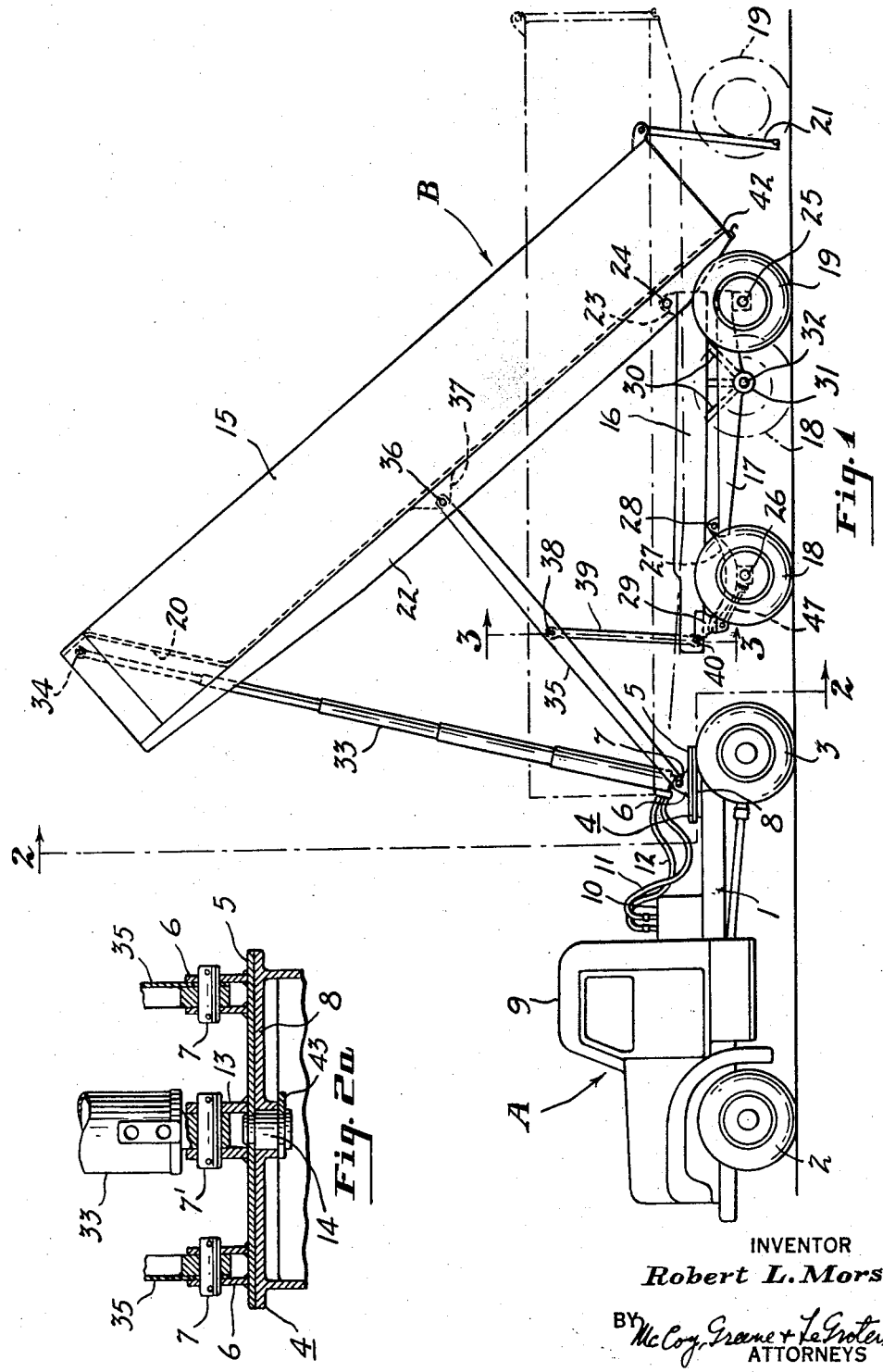
INVENTOR
*Robert L. Morse*
BY *McCoy, Greene + Te Grotenhuis*
ATTORNEYS

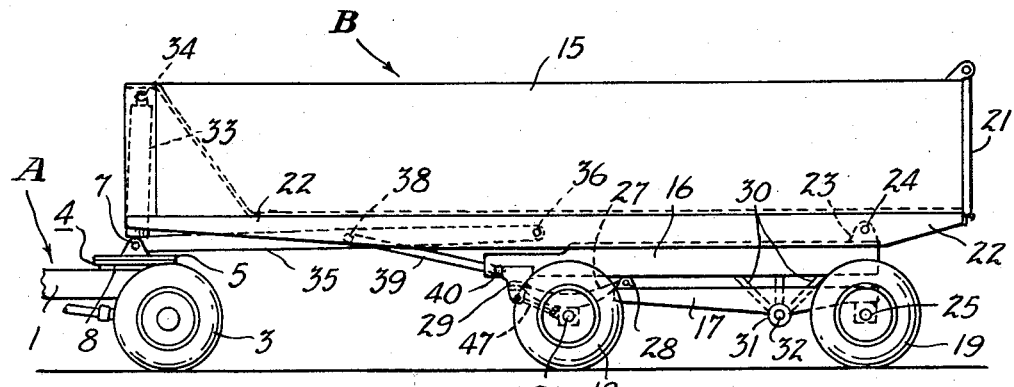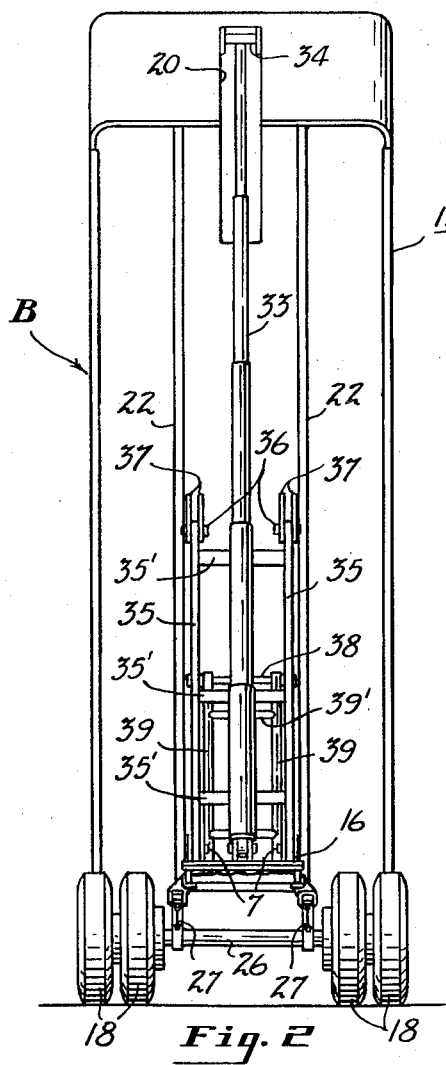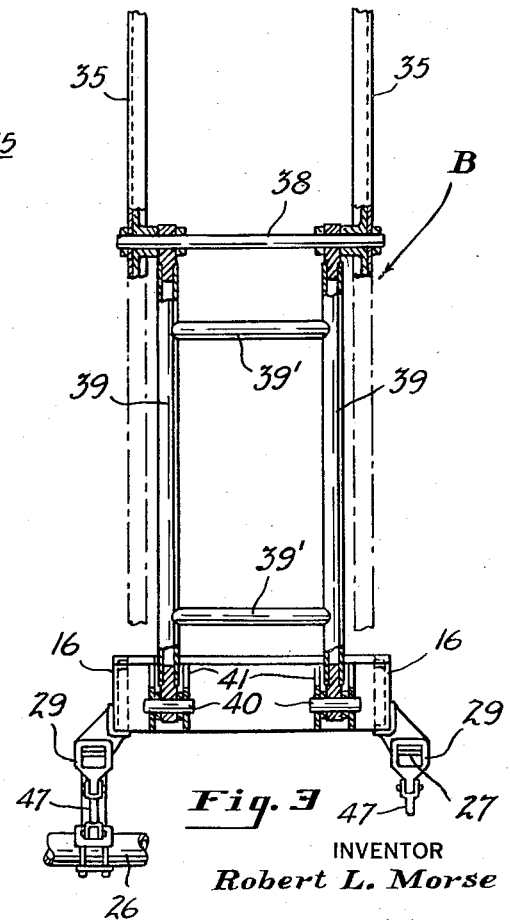

INVENTOR
Robert L. Morse

Sept. 23, 1958 R. L. MORSE 2,853,341
DUMP TRUCK SUPPORT STABILIZING MEANS
Filed Oct. 2, 1956 4 Sheets-Sheet 4
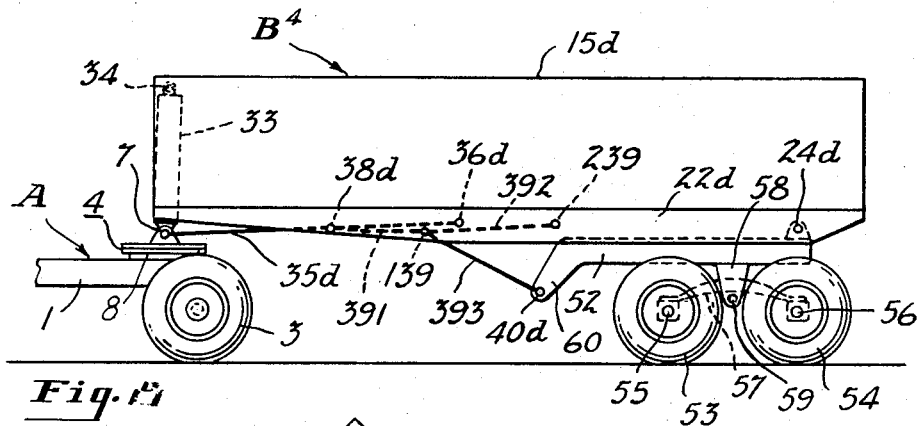
Fig. 8
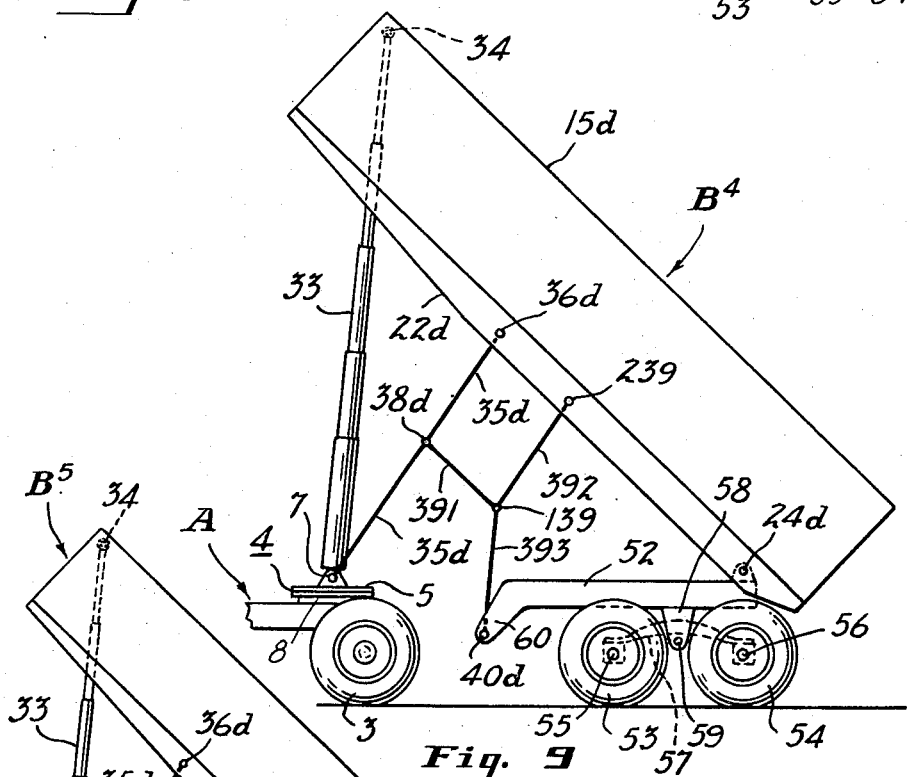
Fig. 9
Fig. 10
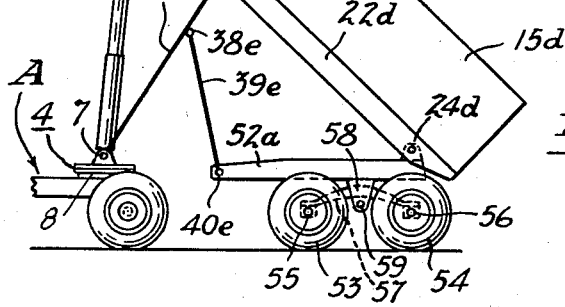
INVENTOR
Robert L. Morse
BY McCoy, Greene & Te Grotenhuis
ATTORNEYS

United States Patent Office 2,853,341
Patented Sept. 23, 1958

2,853,341

DUMP TRUCK SUPPORT STABILIZING MEANS

Robert L. Morse, Shaker Heights, Ohio, assignor of one-half to Julius L. Glick, Shaker Heights, Ohio Application October 2, 1956, Serial No. 613,435

13 Claims. (Cl. 298—20)

The present invention relates to a dumping semi-trailer and more particularly to a semi-trailer of improved construction having a high spill point and having means to prevent lifting of the front portion of the trailer frame away from the ground.

Heretofore dumping semi-trailers have been constructed so that the front portion of the trailer frame moved away from the ground and the spill point moved toward the ground as the load-carrying dump body was tilted vertically to effect dumping. The lowering of the spill point made it difficult to empty the dump body; and, in tandem axle trailers, tilting of the trailer frame below the dump body raised the front wheels of the trailer off the ground whereby the trailer was unstable during dumping.

According to the present invention a dumping semi-trailer is provided having a wheel assembly, a trailer frame, and a vertically tiltable dump body pivotally mounted on the frame to swing vertically about a transverse horizontal axis near the rear of said frame, said frame being mounted on the wheel assembly to swing about a horizontal axis. The semi-trailer is movably connected to the tractor or towing vehicle by a fifth wheel assembly or the like and a draft member which is pivotally connected at its forward end to the upper fifth wheel and at its rear end to the dump body. Means is provided for lifting the front portion of the dump body and for causing the ground-engaging portions of the tractor and the trailer to move toward each other, and means is provided on the trailer for exerting a force on the dump body in a direction to elevate the front end thereof and for exerting a force on the trailer frame in a direction to lower the front end of said frame and to prevent lowering of the pivotal axis of the dump body so that the lowering of the spill point is minimized during dumping. The wheel assembly supporting the trailer frame may include single or tandem axles, and means may be provided for lowering the front end of the trailer frame so as to elevate the pivotal axis of the dump body substantially as the front end of the dump body is elevated during dumping. The means for tilting the trailer may comprise screws, chains, cables or the like for pulling the tractor and trailer toward each other or an external separate hoist or other means acting directly on the front of the dump body to raise the same.

It is preferable to provide front and rear sets of wheels for the semi-trailer particularly where the loads to be carried are heavy and are to be transported for considerable distances. According to the present invention a tandem-axle semi-trailer is provided with an upper trailer frame that is pivotally connected to the dump body and a lower trailer frame or subframe for connection to the wheels of the trailer. A plurality of leaf springs are mounted on the front trailer axle and are connected at their rear ends to the front end portion of the subframe and at their front ends to the front end portion of the upper trailer frame. Means is provided for pivotally connecting the upper frame to the subframe for tilting movement about a transverse horizontal axis parallel to and forwardly of the pivotal axis of the dump body. The rear trailer axle is not provided with springs but is connected to the rear end portion of the subframe, the construction of the trailer being such that adequate cushioning is provided by the springs on the front axle of the trailer.

Means is provided between the dump body and the upper trailer frame for exerting a force on said upper frame that holds the front wheels of the trailer on the ground during dumping whereby such front wheels stabilize the trailer. Said means also prevents substantial downward movement of the horizontal pivotal axis of the dump body so that lowering of the spill point during dumping is minimized. If desired, such means may actually elevate said pivotal axis substantially above its normal position when the dump body is lowered to a normal substantially horizontal position for towing.

The means for holding the front trailer wheels against the ground may be a motor-operated toggle joint or other motor-operated means, such as a telescoping multi-cylinder hoist, or may be link means of various types. A simple way to hold the front trailer wheels against the ground is to provide a supplementary link means between the central portion of the draft link that connects the tractor and the dump body and the front portion of the upper trailer frame for exerting a downward force on the trailer frame in response to dumping of the trailer. It will be apparent that many different means may be employed to prevent tilting of the trailer frame and/or to raise the spill point during tilting of the dump body without departing from the spirit of the invention.

An object of the present invention is to provide a large dumping semi-trailer of simple inexpensive construction having an excellent dumping action.

A further object of the present invention is to provide an improved dumping semi-trailer having tandem axles.

A still further object of the present invention is to provide a dumping semi-trailer having a high spill point so that the material may be unloaded easily from the trailer.

Another object of the invention is to provide a tandem axle semi-trailer having front and rear wheels which remain on the ground during dumping to provide greater stability.

Other objects, uses and advantages of the present invention will become apparent to those skilled in the art from the following description and claims, and from the drawings, in which:

Figure 1 is a side elevational view on a reduced scale showing the dumping semi-trailer of the present invention connected to a tractor or towing vehicle, the trailer being shown in solid lines at its maximum inclination during dumping and in dot-dash lines in its normal horizontal towing position;

Figure 2 is a front elevational view of the trailer taken substantially on the line 2—2 of Fig. 1 and on a larger scale;

Figure 2a is a fragmentary view similar to Fig. 2 and in section showing details of the fifth-wheel assembly on a larger scale;

Figure 3 is a fragmentary front elevational view with parts broken away and shown in section, taken substantially on the line indicated at 3—3 in Fig. 1 and on a larger scale;

Figure 4 is a fragmentary side elevational view of the truck and semi-trailer on a reduced scale showing the normal position of the parts during towing of the trailer;

Figure 8 is a fragmentary schematic side elevational view similar to Fig. 5 showing another modified form of the present invention;

Figure 5:
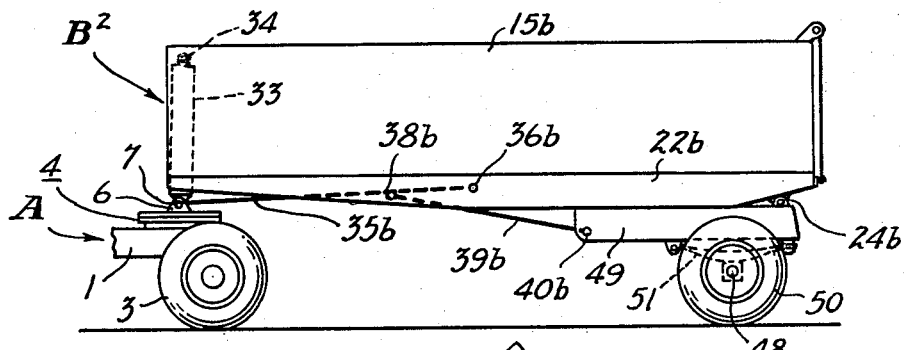
Figure 5 is a fragmentary schematic side elevational view on a reduced scale showing another modified form of the present invention, the parts being shown in their normal traveling position.

Figure 9 is a fragmentary schematic side elevational view showing the truck and semi-trailer of Fig. 8 in their positions during dumping; and Figure 10 is a fragmentary schematic side elevational view on a reduced scale similar to Fig. 9 showing another modified form of tandem-axle semi-trailer according to the present invention, the parts being shown in their position when the dump body is elevated a maximum amount.

Referring more particularly to the drawings, which are drawn substantially to scale and in which like parts are identified by the same numerals through the several views, Figs. 1 to 4 show a tractor or towing vehicle A and a dumping semi-trailer B constructed according to the present invention. The tractor A is generally of conventional construction and includes a metal frame 1, supported by front and rear wheels 2 and 3. A fifth wheel assembly 4 is mounted on the rear portion of the frame 1 to provide a connection between the tractor and trailer and includes a flat upper fifth wheel or turntable 5 having a plurality of vertically extending ears or brackets 6, which provide a support for a pair of aligned horizontal pivot shafts 7, and a lower fifth wheel 8 rigidly connected to the frame 1 and having a flat upper surface. The turnplate 5 is pivotally mounted on the lower fifth wheel 8 for turning about a vertical axis by means including a vertical kingpin 14 which fits in a circular opening at the center of the plate 5 and in an internally cylindrical central recess in the stationary member 8 as is apparent in Fig. 2a. A bracket 13 is rigidly mounted on the plate 5 above the kingpin 14 and supports a horizontal pivot shaft 7' coaxial with the shafts 7. The assembly 4 is spaced rearwardly from the tractor cab 9 a substantial distance so that there is ample room for a tank 10 containing a hydraulic pump or other source of pressure between said cab and said assembly, flexible conduits 11 and 12 being provided to convey hydraulic fluid from the pump to and from the hydraulic hoist 33 as will be hereinafter described.

The semi-trailer B includes a generally rectangular vertically tiltable dump body 15, an upper trailer frame 16 pivotally connected to said dump body, a trailer subframe 17 pivotally connected to the frame 16, and front and rear wheels 18 and 19 for supporting the trailer. The turnplate or foot member 5 is also part of the trailer B and may be detached from the tractor by removing the clamp 43 from the circumferential groove of the pin 14. The dump body 15 is of generally rectangular shape, has a recess 20 at its front end for receiving the hoist, and has a conventional tail gate 21 at its rear end. The bottom portion of the dump body is reinforced by a pair of parallel longitudinal beam members 22 which are rigidly connected to the dump body and extend substantially the full length of the semi-trailer. The trailer frame member 16 has ears or brackets 23 which support a horizontal pivot shaft 24 so as to provide a pivotal connection between said frame member and the rear portion of said dump body 15. It will be apparent from the drawings how the dump body 15 is supported by the wheels 18 and 19 and the remainder of the wheel assembly.

Figure 6:
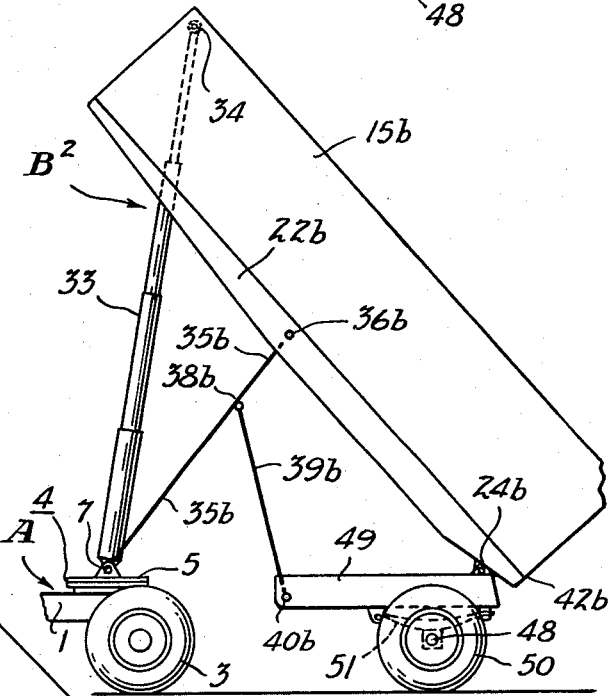
Figure 6 is a fragmentary schematic side elevational view of the truck and semi-trailer of Fig. 5 showing the parts in their position during dumping.
Figure 7:
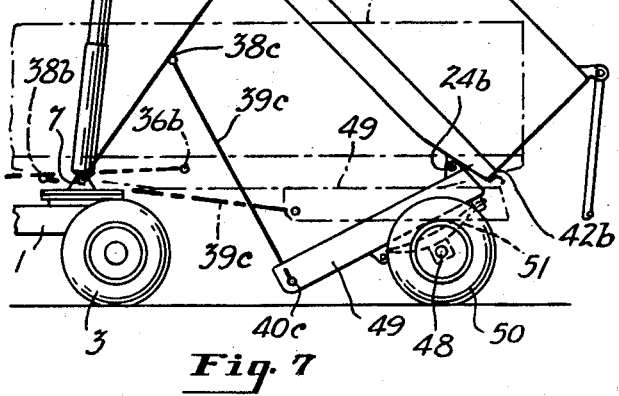
Figure 7 is a fragmentary schematic side elevational view similar to Fig. 6 showing another modified form of the present invention, the parts being shown in dot-dash lines in their normal traveling position and in solid lines in their dumping position.

The rear axle 25 of the wheel assembly is mounted at the rear end of the subframe 17 and the front axle 26 is mounted at the center of the front springs 27 a short distance forwardly of the subframe, conventional pivotal connections being provided at 28 and 29 on each side of the trailer between the springs 27 and the frame members 16 and 17. As herein shown, one multiple-leaf spring 27 is located on each side of the trailer. One of the pivotal connections for each spring may be a link connection, for example, as shown in Figs. 5 to 7, but as herein shown a floating connection is provided at 29 on each side of the trailer. A short link 47 is provided on each side of the trailer below the spring 27 to connect the front axle 26 to the front portion of the frame member 16. As herein shown said link 47 is pivotally connected at its rear end to the axle 26 and is pivotally connected at its front end to the box-like metal member at 29 which surrounds the front end portion of the spring 27. Rigidly mounted on the lower rear portion of the frame member 16 are a series of downwardly projecting arms 30 leading to a boss 31. A horizontal pivot shaft 32 extends through bosses carried by the frame member 17 and the arms 30 to provide a pivotal connection between the frame member 16 and the subframe 17, the shaft 32 being parallel to the shaft 24 and the axles 25 and 26. The arrangement of the frame members 16 and 17 and the springs 27 is such that the springs 27 cushion all the up and down movements both at the front and rear of the frame member 16 so that it is unnecessary to provide additional springs above the rear axle 25.

An extensible five-cylinder hydraulic hoist 33 is provided to effect dumping of the semi-trailer B. The several pistons and cylinders of said hoist are telescopically connected in a conventional manner, the lower cylinder being pivotally connected at its lower end to the turntable 5 by the horizontal pivot shaft 7' and the upper cylinder being pivotally connected to the dump body 15 at its upper end by a horizontal pivot shaft 34 parallel to the pivot shaft 24 and the axle 25.

A draft connection is provided between the tractor A and the semi-trailer B including a draft link having laterally spaced parallel beams 35 rigidly connected by bracing bars 35'; the ends of said beams being pivotally connected to the tractor and the trailer. The forward ends of the beams 35 are pivotally connected to the turntable 5 by shafts 7 and the rear ends of said beams are pivotally connected to the dump body 15 between the parallel beams 22 by aligned pivot shafts 36, said shafts being carried by vertical gusset plates or brackets 37 and held parallel to the shafts 24, 32 and 34. A long horizontal central shaft 38 is mounted between the side beams 35 of the draft link, as best shown in Fig. 3, almost half way between the shafts 7 and 36 and parallel to said shafts.

A supplementary link is provided comprising laterally spaced parallel bars 39 rigidly connected by horizontal bracing bars 39'. The bars 39 are pivotally mounted at their upper ends on the shaft 38 and at their lower ends on coaxial shafts 40 parallel to the shaft 38. The shafts 40 are carried by vertical gusset plates or brackets 41 welded to the upper trailer frame member 16 at the front end thereof. The link 39, therefore, provides a connection between the central portion of the link 35 and the front end portion of the frame member 16. The lengths of the links 35 and 39 and the largest outermost cylinder of the hoist 33 are selected so that the dump body 15 may be lowered to a horizontal position substantially as shown in Fig. 4.

When it is desired to empty the semi-trailer B, the truck is stopped and hydraulic fluid is pumped from the source 10 to the piston-cylinder motor or hoist 33 so as to cause vertical axial extension of the hoist. This lifts the front end of the dump body 15, and the draft link 35 causes relative horizontal movement between the tractor A and the trailer frame 16. Where the draft link 35 is employed, it will be apparent that the dumping of the body 15 may be effected by means other than the hoist 33; for example, by providing chains, screws, cables or other means to pull the wheels 3 and 18 toward each other or by providing a screw, a jack or a separate external hoist to elevate the front end of the dump body 15 directly. However, a multicylinder hoist such as employed at 33 is a preferred construction.

The purpose of the link 39 is to limit movement of the front trailer wheels 18 away from the ground when the dump body 15 is tilted to empty the trailer. The link 39 preferably has a length sufficient to hold the front end portion of the frame member 16 in its lowermost position or against a stop and to hold the front wheels 18 against the ground at all times during the dumping operation so that such wheels stabilize the trailer during dumping. By holding the wheels 18 against the ground the spill point 42 is prevented from moving too close to the ground as would be the case if the upward movement of the wheels 18 were not prevented. If desired, the trailer may be constructed and the length of the link 39 may be selected so that the front end of the frame member 16 is forced downwardly several inches below its normal position during travel of the truck whereby the spill point 42 tends to be elevated by tilting of the frame 16 about its axis at 32. A high spill point is very desirable in any dump truck, as will be apparent to those skilled in the art.

Figures 5 and 6 show another modified form of the present invention schematically, the links being shown by single lines. The single-axle semi-trailer B² of Figs. 5 and 6 is constructed much like the tandem-axle semi-trailers B and B¹ described above and has a dump body 15b pivotally connected to the tractor A by means of a fifth-wheel connection 4. Like the trailers B and B¹, the trailer B² has a five-cylinder telescoping hydraulic hoist 33 connected to the dump body by a pivot shaft 34 and connected to the turnplate 5 by a pivot shaft 7'. A draft link 35b, similar to the link 35 described above and comprising rigid parallel beams rigidly connected by bracing members, extends from the turnplate 5 to the central portion of the dump body 15b near the longitudinal beams 22b mounted on the bottom of said dump body. The ends of the beams 35b are connected to the tractor by the aligned pivot shafts 7 and the opposite ends of said beams are pivotally connected to the dump body 15b by aligned horizontal pivot shafts 36b, similar to the shafts 36 described above.

A horizontal pivot shaft 38b is mounted on the central portion of the draft link 35b, said shaft being closer to the shaft 36b than to the aligned shafts 7 as is apparent from Figs. 5 and 6. A rigid link 39b similar to the link 39 described above is mounted on the shaft 38b and is thereby connected to the draft link, the lower end of the link 39b being pivotally mounted on a horizontal pivot shaft 40b which is carried by the front end portion of the trailer frame 49. The dump body 15b is pivotally mounted near its rear end to the rear end portion of the frame 49 by a horizontal pivot shaft 24b similar to the shaft 24 described above and parallel to the shafts 38b and 40b. The frame 49 is connected to the horizontal axle 48 which carries the trailer wheels 50 through conventional leaf springs 51 or the like whereby the frame 49 is free to pivot about said axle 48 which is parallel to the shafts 24b, 34, 36b, 38b and 40b.

When the single-axle trailer B² is in its normal traveling position as indicated in Fig. 5, the links 35b and 39b are inclined only slightly relative to the horizontal and the dump body 15b rests on the frame 49 in a horizontal position, the longitudinal beams 22b engaging the top of the frame 49 to assist in holding it in a horizontal position. When fluid under pressure is supplied to the hoist 33 to extend the hoist axially, the dump body 15b is swung vertically about its pivot 24b so as to lower the spill point 42b a small amount. However, the link 39b pushes downwardly on the pivot shaft 40b to prevent substantial tilting of the frame 49 during elevation of the pivot shaft 34 so that the spill point 42b is not lowered as much as in prior constructions wherein the frame 49 was allowed to tilt in unison with the dump body about the trailer axle. The supplementary link 39b, therefore, acts like the link 39 described above to prevent substantial lowering of the pivotal axis of the dump body during lifting of the front end of said dump body.

It will be apparent that the pivotal axis of the dump body may be raised during dumping by varying the length of the link 39b or changing the position of the pivot shaft 38b. Figure 7 shows another single-axle semi-trailer B³, according to the present invention, which is exactly the same as the semi-trailer B² described above except that the supplementary link 39b is replaced by a longer link 39c, the pivot shaft 38b is replaced by a pivot shaft 38c located nearer the center of the draft link 35b, and the pivot shaft 40b is replaced by a similar shaft (or shafts) 40c.

The normal position of the parts of the trailer B³ during towing of the trailer is shown in dot-dash lines in Fig. 7. When the hoist 33 is elongated to lift the shaft 34 the maximum amount during dumping, the front end of the frame 49 is pushed downwardly by the link 39c several inches below its normal position which is shown in dot-dash lines in Fig. 7, so that the frame 49 is inclined substantially and the pivot shaft 24b is lifted several inches above its normal position which is shown in solid lines in Fig. 7. The link 39c, therefore, serves to raise the spill point 42b several inches above the position it has in the trailer B² shown in Fig. 6.

Figures 8 and 9 are schematic views showing a modified form of tandem-axle semi-trailer B⁴ constructed according to the present invention. The trailer has a dump body 15d reinforced by longitudinal beams 22d, similar to the body 15 and the beams 22 of the first described trailer B, an upper fifth wheel 5, and a multicylinder telescoping hydraulic hoist 33 like the trailer B for connecting the trailer B⁴ to the lower fifth wheel 8 of the assembly 4 mounted on the rear end of the tractor A. A draft link 35d, similar to the link 35 described above and comprising rigid parallel beams rigidly connected by horizontal bracing members, extends from tractor A to the central portion of the dump body 15d so as to cause the ground-engaging members of the tractor and the trailer to move toward each other when the hoist 33 is extended vertically.

The lower ends of the rigid beams 35d are pivotally connected to the tractor by the aligned pivot shafts 7 and the upper ends of said beams are pivotally connected to the dump body 15d by aligned horizontal pivot shafts 36d similar to the shafts 36 described above. The lower cylinder of the fluid motor 33 is pivotally connected to the tractor A by the central pivot shaft 7' and the upper cylinder of said motor is pivotally connected to the upper front end portion of the dump body 15d by the horizontal pivot shaft 34. The dumping action of the hoist 33 and the draft link 35d of the trailer B⁴ is, therefore, the same as the hoist 33 and the draft link 35 of the trailer B.

The lower rear end portion of the dump body 15d is pivotally connected to the rear end portion of a horizontal trailer frame member 52 by a horizontal pivot shaft 24d parallel to the wheel-carrying axle of the trailer and the shafts 34 and 36d. The trailer frame 52 is mounted on a wheel assembly to pivot about a shaft 59, the action of the wheel assembly being generally that which would be obtained if the trailer had only one axle at 59 for carrying the wheels. The shaft 59 is mounted on downwardly extending brackets 58, which are rigidly mounted on the frame 52. The wheel assembly includes front and rear trailer wheels 53 and 54 mounted on front and rear horizontal axles 55 and 56, and a multiple-leaf spring 57 on each side of the frame 52, pivotally connected at its opposite ends to the axles 55 and 56. The central portions of the two springs 57 are mounted on the shaft 59 so that said springs are free to pivot about the axis of the shaft 59. The trailer frame 52, therefore, functions generally like the frame 49 described above but pivots about the shaft 59 instead of the single trailer axle 48.

A single link similar to the link 39, 39b, or 39c may be connected between the central portion of the draft link 35d and the front portion of the trailer frame 52 (for example, as in Fig. 10) to prevent substantial tilting movement of the trailer frame during dumping of the load carrying body 15d. However, as herein shown another type of linkage is provided between the draft link and the trailer frame. The link means used in the semi-trailer B⁴ includes three rigid links 391, 392 and 393 which are shown schematically by heavy single lines in Figs. 8 and 9, the position of said links when the dump body 15d is in its normal horizontal traveling position being shown in Fig. 8 and the position of said links when the dump body 15d is at its maximum inclination during dumping being shown in Fig. 9. A horizontal pivot shaft 38d is mounted on the central portion of the rigid draft link 35d parallel to the shafts 36d and 7 and pivotally connects the forward end of the link 391 to the draft link 35d. A horizontal pivot shaft 40d is mounted on the front downwardly extending portion 60 of the frame 52 parallel to the shaft 38d and pivotally connects the lower end of the link 393 to the trailer frame.

The links 391 and 393 are pivotally connected by a horizontal pivot shaft 139 and are pivotally connected by the shaft 139 to the lower end of the link 392, the links 391, 392 and 393 radiating from the shaft 139 as best shown in Fig. 9. The upper end of the link 392 is pivotally connected to the dump body 15d between the shafts 36d and 24d by a horizontal pivot shaft 239 parallel to said shafts and to the shafts 139 and 40d. The links 392 and 393, therefore, provide a toggle joint between the central portion of the dump body 15d and the front portion of the trailer frame 52. The rearward force of the link 391 on the toggle joint at 139 during elevation of the front end portion of the dump body 15d applies an upward force on the dump body at 239, and a downward force to the trailer frame 52 at 40d. The downward force on the trailer frame by the link 393 of said toggle joint is sufficient to prevent substantial lowering of the pivotal axis of the dump body at 24d during elevation of the front end of said dump body. The lengths of the links 391, 392 and 393 may be selected so as to hold the trailer frame 52 in a substantially horizontal position throughout the dumping operation, for example as in the trailer B², or may be designed to lower the front end portion of the trailer frame 52 during dumping like the trailer B³.

Figure 10 shows a modified form of tandem-axle semitrailer B⁵ which is substantially the same as the trailer B⁴ except that the link means 391, 392 and 393 is replaced by a single stabilizing link 39e similar to the stabilizing links 39, 39b, and 39c. The link 39e comprises laterally spaced parallel bars rigidly connected by horizontal bracing bars similar to the bars 39' described above. The upper ends of the bars forming the link 39e are pivotally connected to the central portion of the draft link 35d by a horizontal pivot shaft 38e which is parallel to the shaft 36d, and the lower ends of said bars are pivotally connected to the front end portion of the trailer frame 52a by aligned horizontal pivot shafts 40e. The supporting means for the dump body 15d of the trailer B⁵ is the same as that for the trailer B⁴, and the frame 52a is the same as the frame 52 except that the downwardly inclined portion 60 is omitted and the front portion of the frame 52a is straight. However, it will be apparent that the frame 52a could be identical to the frame 52 if the length of the stabilizing link 39e and the position of the shaft 38e were changed. It will also be apparent that the length of the supplementary link 39e could be selected so as to cause lowering of the front end portion of the frame 52a, for example as in the trailer of Fig. 7. However, as herein shown the link 39e functions like the link 39b described above to hold the trailer frame 52a substantially in a horizontal position as the front end of the dump body 15d is raised from its normal horizontal position to its elevated position shown in Fig. 10.

It will be apparent to those skilled in the art that the various supplementary links employed in the semitrailers B, B², B³, and B⁴, may have various lengths and may be connected at various points while still controlling the position of the trailer frame as intended by the present invention. It will also be apparent that the various links could be provided with springs to permit slight changes in the length of the links during operation thereof and that various stops could be provided to limit downward movement of forward portions of the trailer frame during dumping.

It will be understood that the above description is by way of illustration rather than limitation and that, in accordance with the provisions of the patent statutes, variations and modifications of the specific devices disclosed herein may be made without departing from the spirit of the invention.

Having described my invention, I claim:

1. A dumping semi-trailer for use in combination with a tractor having a fifth wheel support plate comprising a tiltable dump body, a trailer frame pivotally connected at its rear end to the rear portion of said dump body on a first horizontal axis transverse of the dump body, a frame supporting wheel assembly and suspension means connected to said frame, said frame being mounted to swing about a second horizontal axis parallel to and spaced forwardly of said first horizontal axis, a turnplate mounted on said fifth wheel support plate, a draft link pivotally connected at its forward end to said turnplate and pivotally connected at its rear end to an intermediate portion of said dump body, elevating means for raising said dump body, and link means connected to said trailer frame forwardly of said second horizontal axis and to an intermediate portion of said draft link for exerting downward force on the forward end of said trailer frame to prevent said forward end from being raised substantially during dumping and said first horizontal axis from being lowered substantially during dumping.

2. A dumping semi-trailer as defined in claim 1 wherein the elevating means for raising said dump body comprises an extensible fluid pressure hoist having a series of telescopically connected cylinders, the lowermost of said cylinders being pivotally attached to said turnplate and the uppermost of said cylinders being pivotally attached to the forward end of said dump body centrally thereof.

3. A dumping semi-trailer as defined in claim 1 wherein the draft link comprises a pair of laterally-braced spaced apart beams and the link means for exerting a downward force on the forward end of said trailer frame comprises a pair of laterally-braced, spaced-apart rigid bars each of which is pivotally connected at its upper end to an intermediate portion of one of said draft link beams and pivotally connected at its lower end to the forward end of said trailer frame forwardly of the axes of the most forward pair of frame supporting wheels.

4. A dumping semi-trailer as defined in claim 1 wherein the link means for exerting a downward force on the forward end of said trailer frame comprises three supplementary links, means pivotally connecting the three supplementary links at a point rearwardly of the draft link and between the trailer frame and the dump body, said supplementary links radiating from said last-named point to provide a toggle joint and being connected to the draft link, the dump body and the upper trailer frame, one supplementary link being pivotally connected to a central portion of the draft link, another being pivotally connected to the front end portion of the upper trailer frame, and the other being pivotally connected to said dump body rearwardly of said draft link.

5. A dumping semi-trailer for combination with a tractor comprising a tiltable dump body, a trailer frame pivotally connected at its rear end to the rear portion of said dump body on a first horizontal axis transverse of the dump body, a trailer subframe beneath said trailer frame and pivotally connected thereto on a second horizontal axis parallel to and spaced forwardly of said first horizontal axis, a pair of rear dump body wheels supporting and connected to said trailer subframe rearwardly of said second horizontal axis, a pair of front dump body springs mounted on a front dump body wheel axle and a pair of front dump body wheels in turn mounted on said axes, a pivotal connection between the rear eyes of the front dump body springs and the front of said trailer subframe, a pivotal connection between the front eyes of the front dump body springs and the trailer frame, a turnplate mounted on said fifth wheel support plate, a pair of draft link beams pivotally connected at their forward end to said turnplate and pivotally connected at its rear end to the central portion of said dump body, an extensible hydraulic hoist for raising said dump body pivotally connected to said turnplate and to the front portion of the dump body, and a pair of rigid link bars pivotally connected at their upper ends to an intermediate portion of said draft link beams and pivotally connected at their lower ends to the forward end of said trailer frame forwardly of said front dump body wheel axle, said link bars preventing said trailer frame from pivoting substantially upwardly about the second horizontal axis during dumping.

6. A dumping semi-trailer for combination with a tractor comprising a tiltable dump body, a trailer frame pivotally connected at its rear end to the rear portion of said dump body on a first horizontal axis transverse of the dump body, a dump body wheel assembly pivotally connected to said trailer frame on a second horizontal axis parallel to and spaced forwardly of said first horizontal axis, a turnplate mounted on said fifth wheel support plate, a draft link pivotally connected at its forward end to said turnplate and pivotally connected at its rear end to the central portion of said dump body, an extensible hydraulic hoist for raising said dump body pivotally connected to said turnplate and to the front portion of the dump body, and rigid link means pivotally connected at its upper end to an intermediate portion of said draft link and pivotally connected at its lower end to the forward end of said trailer frame forwardly of the axle of the most forward pair of wheels of the dump body wheel assembly, said rigid link means preventing said trailer frame from pivoting substantially upwardly about said second horizontal axis during dumping and preventing said first horizontal axis from being lowered substantially during dumping.

7. A dumping semi-trailer for combination with a tractor comprising a tiltable dump body, a trailer frame pivotally connected at its rear end to the rear portion of said dump body on a first horizontal axis transverse of the dump body, a frame supporting wheel assembly and suspension means connected to said frame, said frame being mounted to swing about a second horizontal axis parallel to and spaced forwardly of said first horizontal axis, a turnplate mounted on said fifth wheel support plate, a draft link pivotally connected at its forward end to said turnplate and pivotally connected at its rear end to the central portion of said dump body, an extensible hydraulic hoist for raising said dump body pivotally connected to said turnplate and to the front portion of the dump body, and rigid link means pivotally connected at its upper end to an intermediate portion of said draft link and pivotally connected at its lower end to the forward end of said trailer frame forwardly of the axle of the most forward pair of wheels of the dump body wheel assembly, said rigid link means preventing said trailer frame from pivoting substantially upwardly about said second horizontal axis during dumping and preventing said first horizontal axis from being lowered substantially during dumping.

8. A semi-trailer as defined in claim 7 wherein said rigid link means is proportioned so as to raise said first horizontal axis during dumping.

9. A dumping semi-trailer for combination with a tractor comprising a tiltable dump body, a trailer frame pivotally connected at its rear end to the rear portion of said dump body on a first horizontal axis transverse of the dump body, front and rear pairs of dump body supporting wheels, axles, and suspension means therefor connected to said trailer frame so as to pivot about a second horizontal axis which is intermediate said front and rear wheel axles and is parallel to and spaced forwardly of said first horizontal axis, a turnplate mounted on said fifth wheel support plate, a draft link pivotally connected at its forward end to said turnplate and pivotally connected at its rear end to the central portion of said dump body, means for elevating said dump body, and rigid link means pivotally connected at its upper end to an intermediate portion of said draft link and pivotally connected at its lower end to the forward end of said trailer frame forwardly of the axle of the most forward pair of wheels of the dump body wheel assembly, said rigid link means preventing the forward end of said trailer frame from being raised substantially during dumping and preventing said first horizontal axis from being lowered substantially during dumping.

10. A dumping semi-trailer for combination with a tractor comprising a tiltable dump body, a trailer frame pivotally connected at its rear end to the rear portion of said dump body on a first horizontal axis transverse of the dump body, a pair of dump body supporting wheels and an axle therefore with the axle spaced forwardly of said first horizontal axis, suspension means mounted between said axle and said trailer frame, a turnplate mounted on said fifth wheel support plate, a draft link pivotally connected at its forward end to said turnplate and pivotally connected at its rear end to the central portion of said dump body, elevating means for raising said dump body, and rigid link means pivotally connected at its upper end to an intermediate portion of said draft link and pivotally connected at its lower end to the forward end of said trailer frame forwardly of the dump body supporting wheel axle, said link means preventing the forward end of said trailer frame from being raised substantially during dumping and preventing said first horizontal axis from being lowered substantially during dumping.

11. A dumping semi-trailer for combination with a tractor comprising a tiltable dump body, a trailer frame pivotally connected at its rear end to the rear portion of said dump body on a first horizontal axis transverse of the dump body, front and rear trailer axles, wheels and a wheel assembly therefor pivotally connected to said trailer frame on a second horizontal axis parallel to and spaced forwardly of said first horizontal axis, a turnplate mounted on said fifth wheel support plate, draft means comprising a pair of laterally spaced and laterally braced draft arms pivotally connected to said turnplate and to the central portion of said dump body, an extensible hydraulic hoist for raising said dump body pivotally connected to said turnplate and to the front portion of the dump body, and rigid hold-down means comprising a pair of laterally spaced and laterally braced bars pivotally connected to intermediate portions of said draft arms and to said trailer frame forwardly of the front trailer axle, said hold-down means preventing said first horizontal axis from being lowered substantially during dumping.

12. A dumping semi-trailer for use in combination with a tractor having a fifth wheel support plate comprising a tiltable dump body member, a trailer frame pivotally connected at its rear end to the rear portion of said dump body on a first horizontal axis transverse of the dump body, a frame supporting wheel assembly and suspension means connected to said frame, said frame being mounted to swing about a second horizontal axis parallel to and spaced forwardly of said first horizontal axis, a turnplate mounted on said fifth wheel support plate, a draft link member pivotally connected at its forward end to said turnplate and pivotally connected at its rear end to an intermediate portion of said dump body member, elevating means for raising said dump body member, and link means connected to an intermediate portion of one of said members and to said trailer frame forwardly of said second horizontal axis for exerting sufficient downward force on the forward end of said trailer frame to prevent said forward end from being raised substantially upward during dumping and said first horizontal axis from being lowered substantially during dumping.

13. A dumping semi-trailer for use in combination with a tractor having a fifth wheel support plate comprising a tiltable dump body member, a trailer frame pivotally connected at its rear end to the rear portion of said dump body on a first horizontal axis transverse of the dump body, a frame supporting wheel assembly and suspension means connected to said frame, said frame being mounted to swing about a second horizontal axis parallel to and spaced forwardly of said first horizontal axis, a turnplate mounted on said fifth wheel support plate, a draft link member pivotally connected at its forward end to said turnplate and pivotally connected at its rear end to an intermediate portion of said dump body member, elevating means for raising said dump body member, and link means for exerting downward force on the forward end of said trailer frame which comprises a first link pivotally connected to the forward end of said trailer frame at one end and pivotally connected to a second link at the other end, said second link in turn being pivotally connected to one of said members, said first and second links forming a toggle joint, and means for exerting force on said toggle joint so as to prevent said forward end from being raised substantially during dumping and said first horizontal axis from being lowered substantially during dumping.

References Cited in the file of this patent

UNITED STATES PATENTS

| | | |
|---|---|---|
| 2,148,798 | Barrett | Feb. 28, 1939 |
| 2,309,787 | Quintin et al. | Feb. 2, 1943 |
| 2,449,202 | Day | Sept. 14, 1948 |
| 2,539,086 | Kirksey | Jan. 23, 1951 |
| 2,635,919 | Watson | Apr. 21, 1953 |
| 2,661,236 | Schonrock | Dec. 1, 1953 |
| 2,775,480 | Braswell | Dec. 25, 1956 |